United States Patent
Cleveland

(10) Patent No.: US 7,127,994 B2
(45) Date of Patent: Oct. 31, 2006

(54) LOW SHOCK SEPARATION JOINT

(75) Inventor: Mark A. Cleveland, Westminster, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/692,971

(22) Filed: Oct. 24, 2003

(65) Prior Publication Data
US 2005/0103220 A1 May 19, 2005

(51) Int. Cl.
F42B 15/10 (2006.01)
(52) U.S. Cl. ........................... 102/378; 89/1.14
(58) Field of Classification Search .............. 102/378, 102/377; 89/1.14; 60/632
See application file for complete search history.

(56) References Cited

U.S. PATENT DOCUMENTS

| | | | | |
|---|---|---|---|---|
| 3,230,885 A * | 1/1966 | Weber et al. | ................. | 403/11 |
| 3,262,351 A * | 7/1966 | Webb | ......................... | 411/434 |
| 3,633,456 A * | 1/1972 | Carr et al. | .................... | 89/1.14 |
| 3,993,001 A * | 11/1976 | Hawes | ........................ | 89/1.14 |
| 4,257,639 A * | 3/1981 | Stock | ....................... | 294/82.26 |
| 4,648,227 A * | 3/1987 | Reusch | ......................... | 52/419 |
| 4,685,376 A * | 8/1987 | Noel et al. | .................... | 89/1.14 |
| 4,879,941 A * | 11/1989 | Repe et al. | .................... | 89/1.14 |
| 5,056,950 A * | 10/1991 | Rateick et al. | ................ | 403/24 |
| 5,109,749 A * | 5/1992 | Olcer | ........................ | 89/1.14 |
| 5,129,306 A * | 7/1992 | Fauvel | ....................... | 89/1.14 |
| 5,331,894 A * | 7/1994 | Wassell et al. | ......... | 102/275.12 |
| 5,372,071 A | 12/1994 | Richards et al. | | |
| 5,735,626 A * | 4/1998 | Khatiblou et al. | ............ | 403/16 |
| 5,743,492 A * | 4/1998 | Chan et al. | .............. | 244/118.2 |
| 6,125,762 A * | 10/2000 | Fritz et al. | ................... | 102/378 |
| 6,629,486 B1 * | 10/2003 | Forys et al. | ................. | 89/1.14 |
| 6,662,702 B1 * | 12/2003 | Vidot et al. | ................... | 89/1.14 |
| 6,675,692 B1 * | 1/2004 | Goetz | ......................... | 89/1.14 |
| 2001/0025564 A1 * | 10/2001 | Forys et al. | ................ | 89/1.14 |

(Continued)

FOREIGN PATENT DOCUMENTS

| EP | 1 355 120 A | 10/2003 |
|---|---|---|
| JP | 56 002300 A | 1/1981 |
| JP | 59 216800 A | 12/1984 |

(Continued)

OTHER PUBLICATIONS

PCT Int'l Search Rep, Feb. 11, 2005, US2004/034875.

(Continued)

Primary Examiner—Troy Chambers
(74) Attorney, Agent, or Firm—Ingrassia Fisher & Lorenz, P.C.

(57) ABSTRACT

Methods and apparatus are provided for a low shock separation joint. A first member couples to a first structure and includes surfaces to prevent separation under compressive and tensile force placed on the separation joint. A second member couples to a second structure and includes surfaces corresponding to the surfaces of the first member. The first member is elastically flexed to allow the surfaces of the first and second members to be aligned to one another. The first member is released from flexing which couples the first and second members together. An explosive device is placed within the separation joint. Detonating the explosive device moves the surfaces of the first and second members out of contact with one another decoupling the first and second members. A passive force is applied to accelerate the first and second members away from one another. After detonation the first and second members are intact.

11 Claims, 7 Drawing Sheets

U.S. PATENT DOCUMENTS

2003/0196544 A1* 10/2003 Comtesse .................. 89/1.14
2004/0057787 A1   3/2004 Cleveland

FOREIGN PATENT DOCUMENTS

JP   60 061400 A   4/1985
JP   02 216399 A   8/1990

OTHER PUBLICATIONS

The Boeing Company, PCT Written Opinion, PCT/US2004/034875, Apr. 24, 2006.

The Boeing Company, PCT International Preliminary Report, PCT/US2004/034875, Apr. 24, 2006.

* cited by examiner

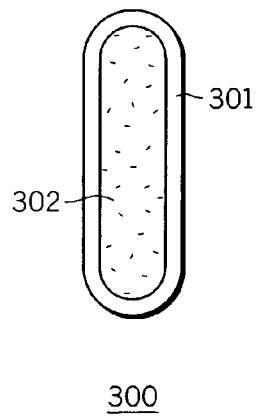
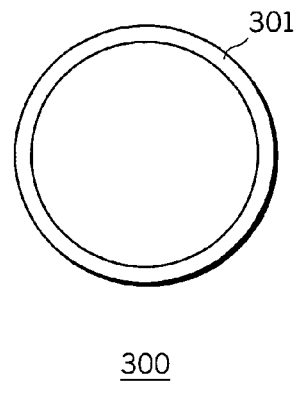
FIG. 3
-PRIOR ART-
FIG. 4
-PRIOR ART-
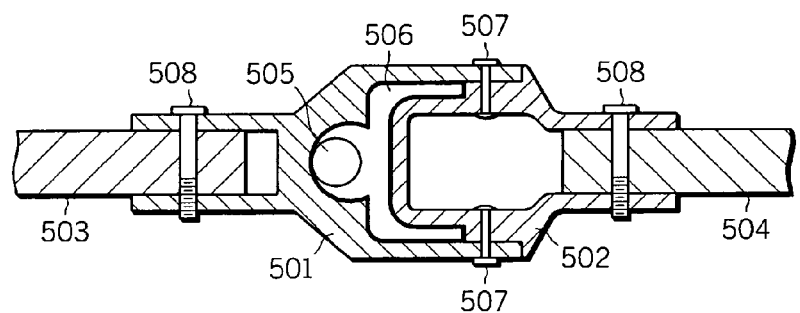
FIG. 5
-PRIOR ART-
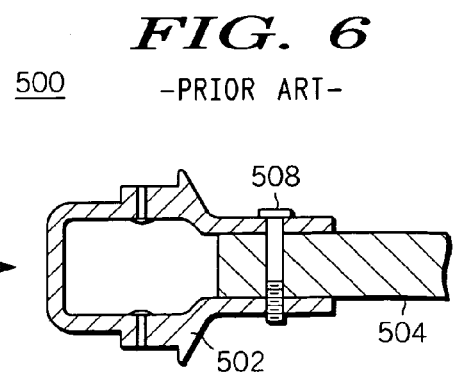
FIG. 6
-PRIOR ART-

LOW SHOCK SEPARATION JOINT

TECHNICAL FIELD OF THE INVENTION

The present invention generally relates to separation joints, and more particularly relates to separation joints having an explosive ordnance.

BACKGROUND OF THE INVENTION

A launch vehicle such as a rocket requires a tremendous amount of energy to escape Earth's gravity. Thus, a primary goal in the design of a rocket is to maximize the payload that is carried while utilizing the minimum amount of fuel. An efficient methodology that has been widely used in the aerospace industry is a staged rocket. The premise behind a staged rocket is that unneeded mass is jettisoned as soon as possible thereby increasing the payload that can be sent. FIG. 1 is an illustration of a prior art two stage rocket 100. Rocket 100 comprises a first rocket stage 101, a second rocket stage 102, and a fairing 103. Initial acceleration of rocket 100 from standstill requires first rocket stage 101 to have high thrust engines and large propellant tanks to feed these engines. First rocket stage 101 provides thrust to accelerate the entire mass of rocket 100. First rocket stage 101 is separated from second rocket stage 102 and fairing 103 by a separation joint 104. Separation typically occurs at a high altitude where a large engine is no longer needed thereby greatly reducing the mass of rocket 100.

Second rocket stage 102 is enabled after separation from first rocket stage 101 to provide thrust to keep rocket 100 on its intended path. Similar to first rocket stage 101, second rocket stage 102 is no longer needed as it approaches burning its entire fuel load. A separation joint 105 separates second rocket stage 102 from fairing 103. It may also be noted that under some circumstances that fairing 103 is separated from the rocket during first stage 101 burn in order to shed mass as soon as possible and maximize payload to orbit.

FIG. 2 is an illustration of prior art two stage rocket 100 of FIG. 1 showing first rocket stage 101, second rocket stage 102, and fairing 103 separated from one another. Separation of first rocket stage 101 from second rocket stage 102 exposes a rocket engine of rocket stage 102. Fairing 103 is separated exposing a payload 107 that was housed in fairing 103. Although rocket 100 is greatly simplified it illustrates the need for an extremely reliable separation system. A failure in any one of separation joints 104–106 of FIG. 1 would result in a complete failure of the mission at a cost of time, money, and perhaps human life.

Many different types of separation joints have been proven to be extremely reliable in applications similar to that described hereinabove. One type utilizes an explosive device to alter the separation joint from a fastened state to a decoupled state. In general, a separation joint comprises a first and second element. The first and second elements respectively couple to first and second structures that are to be separated under certain conditions. Typically, the first and second elements of the separation joint connect together in a manner where they will not separate under all normal operating conditions other than when the explosive device is detonated. The most prevalent method of holding the separation joint together is to use bolts, rivets, or other mechanical fasteners.

FIG. 3 is a cross-sectional view of a prior art explosive device 300 used in a separation joint. Explosive device 300 comprises a tube 301 and an explosive material 302. In an embodiment of explosive device 300, explosive material 302 is a mild detonation cord. The mild detonation cord is often encased in a sheath that fits within the cavity of tube 301 such that the mild detonation cord is centrally located within tube 301. For example, the sheath may comprise silicone rubber or a shock absorbing/thermally insulating material. Contamination of the field around the separation joint is a critical issue. Tube 301 contains the debris generated from the explosion to prevent contamination of the area near the separation joint. Also, tube 301 is easily formed in a shape for a particular application. For example, a separation joint between two rocket stages is circular in shape, thus tube 301 is circumferentially placed in the joint separating the two rocket stages to provide simultaneously release when detonated.

FIG. 4 is a cross-sectional view of the prior art explosive device 300 of FIG. 4 after detonation. Detonation of explosive material 302 within tube 301 generates gases that radiate radially from the charge. Tube 301 expands under the pressure of the gases generated by the explosion but is designed not to rupture to prevent particle contamination. In an embodiment of explosive device 300, tube 301 is formed of thin walled stainless steel. The rapidly increasing pressure created by the detonation of explosive material 302 causes tube 301 to expand to final state as shown in FIG. 4.

It is this change in volume of tube 301 from FIG. 3 to FIG. 4 after explosive material 302 is ignited that is used to produce a condition where a separation joint separates. As mentioned previously, separation joints are held together with rivets, bolts or other mechanical fasteners. The expansion of tube 301 generates an extremely high force. The force is applied in a manner to shear rivets or fracture elements of the separation joint thereby releasing the joint to separate.

A significant problem with this type of separation joint are the shockwaves that are generated. The shockwaves are coupled to the attached structures of the separation joint. The problem is greatly exacerbated by the release of constrained energy due to the shearing or fracturing of components in the separation process. Shockwaves of up to 5000 g can be coupled to the attached structure. For example, NASA estimates that 45% of all first day spacecraft failures are attributed to damage caused by high dynamic environments. This problem exists today with all new proposed spacecraft designs. Spacecraft are typically ground tested to detect failures using random vibration, acoustic, and shock testing to simulate a launch environment. Perhaps more sensitive to the shockwaves generated by the separation joint is the payload within the spacecraft. The payload is often extremely sensitive or fragile to shock. The cost increases greatly to design components (in the payload) to be more shock resistant. Much of the research is focused on ways to minimize damage to the payload using isolation and damping techniques on the platform on which the payload is mounted.

Accordingly, it is desirable to provide a separation joint that greatly reduces shockwaves transferred to an attached structure when separation occurs. In addition, it is desirable to provide reduce the cost of manufacture and increase the reliability of the separation system. Furthermore, other desirable features and characteristics of the present invention will become apparent from the subsequent detailed description and the appended claims, taken in conjunction with the accompanying drawings and the foregoing technical field and background.

BRIEF SUMMARY OF THE INVENTION

Methods and apparatus are provided for a low shock separation joint. The apparatus comprises a first member for coupling to a first structure, a second member for coupling to a second structure, and an explosive device. The first member includes surfaces to prevent separation of the separation joint under compressive and tensile forces. The second member includes surfaces corresponding to the surfaces of the first member. The first member is elastically flexed to allow the surfaces of the first and second members to be aligned to one another. Releasing the first member from flexing mates the surfaces of the first and second member thereby coupling the first and second members together. The explosive device is placed within the separation joint to decouple the first member from the second member when detonated. The method comprises coupling a first member to a second member such that the first and second members have surfaces in intimate contact with one another that prevent separation of the separation joint under compressive and tensile forces. Detonating an explosive device to move the surfaces of the first and second members out of contact with one another. The first and second members are intact after detonation. The first and second members are passively accelerated from one another.

BRIEF DESCRIPTION OF THE DRAWINGS

The present invention will hereinafter be described in conjunction with the following drawing figures, wherein like numerals denote like elements.

FIG. 3 is a cross-sectional view of a prior art explosive device used in a separation joint;

FIG. 4 is a cross-sectional view of the prior art explosive device of FIG. 4 after detonation;

FIG. 5 is a cross-sectional view of a prior art separation joint;

FIG. 6 is the cross-sectional view of the prior art separation joint of FIG. 5 when separated;

DETAILED DESCRIPTION OF THE INVENTION

Figures 1, 2:
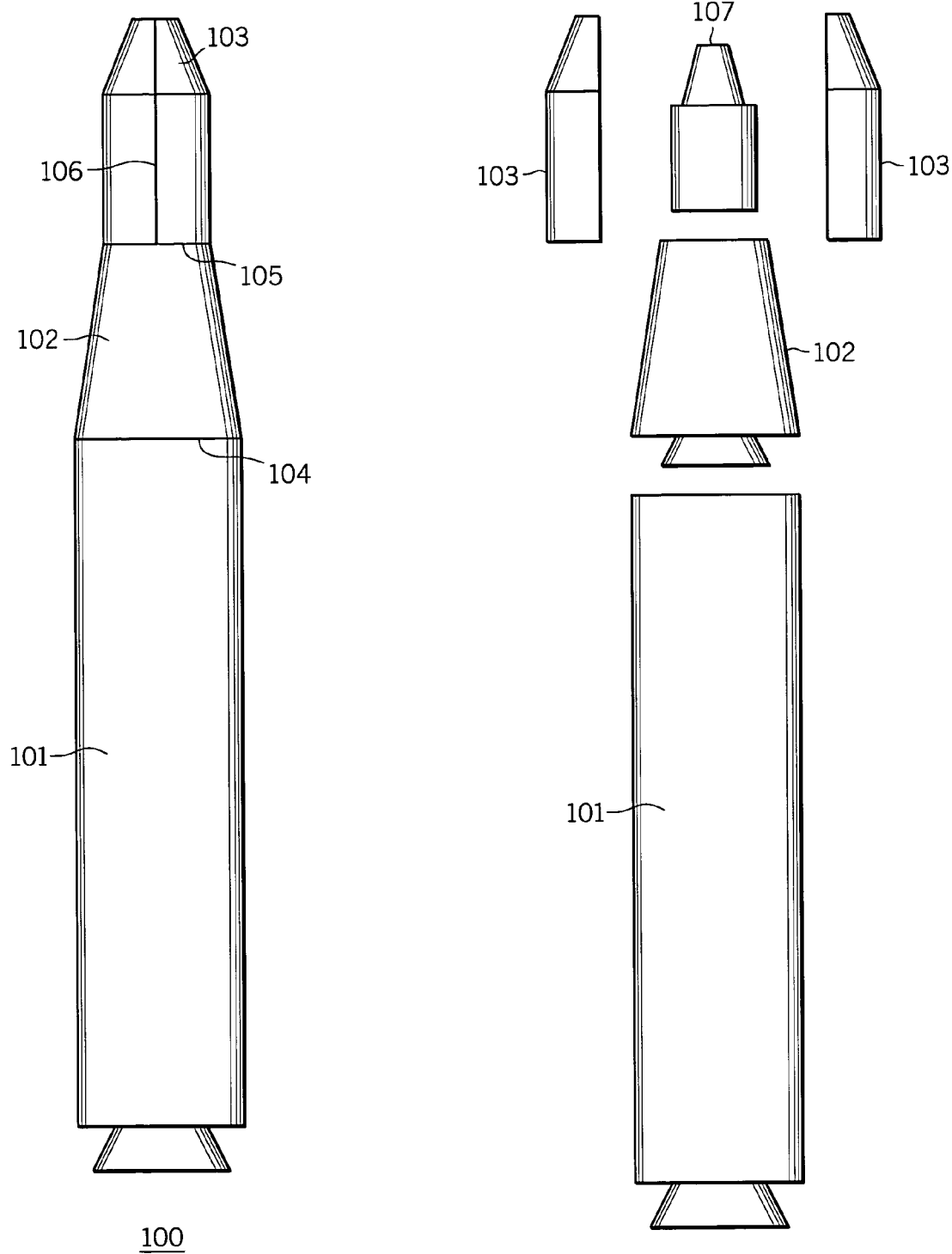
FIG. 1 is an illustration of a prior art two stage rocket.
FIG. 2 is an illustration the prior art two stage rocket of FIG. 1 showing a first rocket stage, a second rocket stage, and a fairing separated from one another.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

FIG. 5 is a cross-sectional view of a prior art thrusting separation joint 500. A thrusting separation joint 500 utilizes an explosive device 505 to impart a force that separates members 501 and 502. For example, in an application such as the separation of a rocket fairing it is important to get both member 501 and 502 moving away from one another at a predetermined velocity to ensure the release of the payload stored within the rocket fairing. In one embodiment, this separation velocity is on the order of 20 feet per second or greater. Separation joint 500 comprises member 501, member 502, explosive device 505, inflatable element 506, and rivets 507.

Member 501 is a female member of separation joint 500. Explosive device 500 is housed in a recess formed in member 501. Explosive device 505 is designed to vent gas generated during detonation to inflatable element 506. Inflatable element 506 is made of a material having sufficient strength to prevent rupture during rapid expansion. Explosive device 505 and inflatable element 506 are attached to member 501. Member 501 has a first and second clevis. Structure 503 fits within the first clevis and is attached to member 501 with bolts 508 that couple through both the first clevis and structure 503. Structure 503 is rigidly attached to member 501. The second clevis forms part of the structure that couples member 501 to member 502. As shown, inflatable element 506 in a deflated state is fitted within the second clevis.

Member 502 is a male member of separation joint 500 that is designed to mate with member 501. In particular, a portion of member 502 fits within the second clevis of member 501. Member 502 includes surface area that is in contact with inflatable element 506. Inflatable element 506 will push against this surface imparting a force on member 502 when detonated. Member 502 also includes sliding surfaces that mate with inner surfaces on the second clevis of member 502. It should be noted that there is minimal resistance when member 501 and member 502 are mated together. In fact, separation joint 500 is designed to separate freely. Rivets 507 hold member 501 to member 502. The rivets couple through both the second clevis of member 501 and the portion of member 502 that fits within the second clevis. Rivets 507 securely fastens member 501 to member 502 under normal operating conditions of separation joint 500. Member 502 also has a clevis. Structure 504 fits within the clevis of member 501 with bolts 508 that couple through both the clevis and structure 504. Structure 504 is rigidly attached to member 502.

FIG. 6 is the cross-sectional view of the prior art thrusting separation joint 500 of FIG. 5 when separated. A separation event is initiated when explosive device 505 is detonated. Gas generated during the controlled detonation are vented into inflatable element 506. Inflatable element 506 expands within the second clevis of member 501. Explosive device 505 and inflatable element 506 has two functions, first it frees separation joint 500 and second imparts a force to accelerate members 501 and 502 away from one another. As inflatable element 506 inflates it pushes against a surface of member 502. The force imparted on member 502 shears rivets 507 such that member 501 and member 502 are no longer held together. As mentioned previously, members 501 and 502 are designed to provide little resistance to separation once rivets 507 are broken. Structure 503 remains rigidly attached to member 501. Similarly, structure 504 remains rigidly attached to member 502. Thus, separation of structures 503 and 504 is achieved and inflatable element 506 thrusts members 501 and 502 away from one other at a predetermined velocity that is a function of the design of separation joint 500.

As mentioned, separation does not occur until rivets 507 are sheared. In other prior art embodiments, structural elements of separation joint 500 are fractured to release the joint to separate. The common aspect of these release methodologies is that a tremendous amount of constrained energy is released when shearing or fracturing occurs. This release of energy corresponds to a high magnitude shockwave that is imparted to both structures 503 and 504 through separation joint 500. The shockwave can damage structures 503 or 504 or cargo that may be carried therein.

Figure 7:
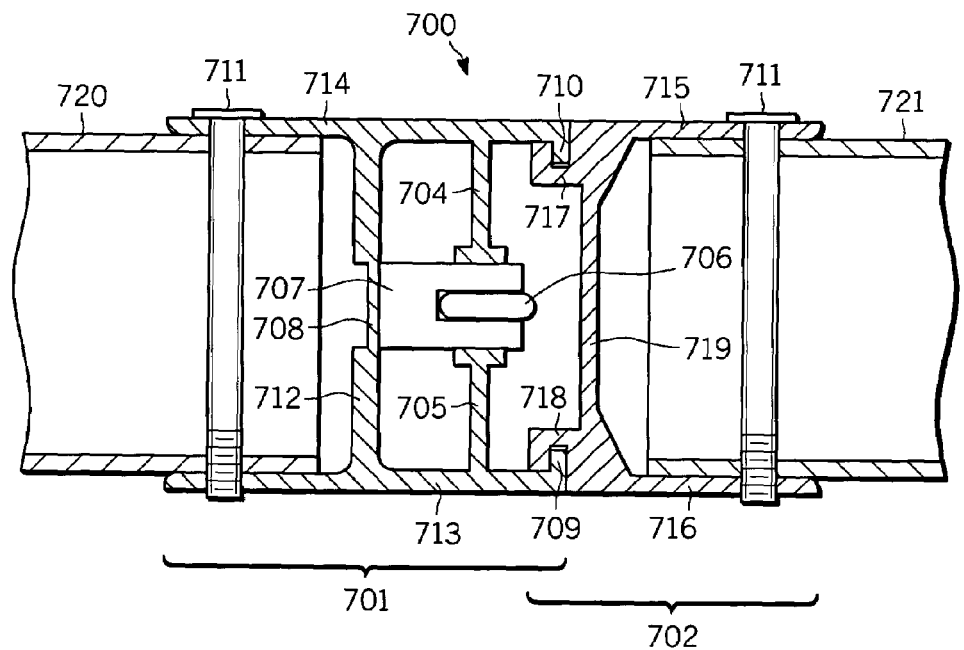
FIG. 7 is a cross-sectional view of a separation joint for reducing shock in accordance with the present invention.

FIG. 7 is a cross-sectional view of a separation joint 700 for reducing shock in accordance with the present invention. In general, separation joint 700 couples a structure 720 to a structure 721. Under normal operating conditions separation joint 700 rigidly holds structures 720 and 721 together to form a contiguous structure. An example of a contiguous structure is a fairing in a rocket assembly, the fairing may comprise two shell halves that are held together by a separation joint that functions as a single shell enclosing the payload of the rocket assembly. Similarly, a separation joint between a first stage and second stage of a rocket couples the stages together to form a contiguous structural component. Separation joint comprises a member 701 coupled to a member 702. Structure 720 couples to member 701. Structure 721 couples to member 702. Members 701 and 702 couple together to form separation joint 700.

Prior art separation joints utilize an explosive device to shear or fracture components of the separation joint to create a condition where the joint can freely separate. The shockwave generated by this destructive methodology is of a magnitude that can produce damage as it couples through the separation joint to the attached structure. Separation joint 700 reduces the magnitude of the shockwave by an order of magnitude or more by eliminating the shearing or fracturing of a component to release separation joint 700 while using an explosive device 706 to ensure separation. In other words, all the components of separation joint 700 are intact after detonation of explosive device 706. The simultaneous release of the constrained energy of the holding mechanism used in prior art separation joints that creates a high magnitude impulse shock wave does not exist in separation joint 700. Separation joint 700 separates without the release of constrained energy by moving contact surfaces that are used to prevent separation of separation joint 700 under compressive and tensile stress (normal operating conditions) away from one another during a separation event.

Member 701 comprises a structural element 712, a structural element 713, and a structural element 714. Structural elements 713 and 714 are substantially parallel to one another. In an embodiment of member 701, structural elements 713 and 714 form walls that isolate internal elements such as explosive device 706 from an external environment. Structural element 712 couples to and supports structural elements 713 and 714. Structural element 712 is proximally located and substantially perpendicular to a major surface of structural elements 713 and 714. In an embodiment of member 701, in cross-section, structural elements 712, 713, and 714 form an I-beam like structure. On a structure attachment side of structural element 712, structural elements 712, 713, and 714 form a clevis for receiving structure 720. Structure 720 is rigidly attached to member 701 by bolts 711 that couple through structural element 714, structure 720, and structural element 713. Other equivalent fastening means known to one skilled in the art could also be used to attach structure 720 to member 701.

Explosive device 706 is housed on a joint side of structural element 712 in relation to structure 720. The joint side of member 701 is the side that contains components that couple to member 702. In an embodiment of separation joint 700, explosive device 706 is a tube type explosive device that is in a flattened or oval shape prior to detonation having a first volume. Upon detonation, rapidly expanding gas within explosive device 706 expands the tube to a second volume that is greater than the first volume. The tube is made from a material such as thin walled stainless steel that will expand but not rupture from detonation of the explosives within explosive device 706. Explosive device 706 does not add debris after separation of separation joint 700 that can contaminate a field near the separation area.

In an embodiment of member 701, explosive device 706 is held by pressure applied by structural elements 713 and 714. A holding member 704 extends from structural element 714 on the joint side and ends in a support surface. Similarly, a holding member 705 extends from structural element 713 and ends in a support surface. The support surfaces of holding members 704 and 705 oppose one another and are spaced a predetermined distance apart to hold explosive device 706. A thinned portion 708 of structural element 712 aids in the process of placing explosive device 706 between the support surfaces of holding members 704 and 705 and will be described in more detail later in the specification.

In an embodiment of separation joint 700, explosive device 706 is isolated and damped from vibration and shock imparted to member 701 by crushable material 707. Crushable material 707 has a thickness slightly greater than the predetermined distance between the support surfaces of holding members 704 and 705. In an embodiment of member 701, a slot is centrally cut or formed in crushable material 707 and explosive device 706 is placed therein. Explosive device 706 is centrally located between the support surfaces of holding members 704 and 705. Thus, damping is provided by crushable material 707 since it is between explosive device 706 and the support surfaces of holding members 704 and 705. In one embodiment, crushable material 707 extends past the support surfaces of holding members 704 and 705 abutting a surface of structural element 712. This simplifies alignment when placing crushable element 707 and explosive device within member 701 and prevents shifting during normal operation. An example of crushable material 707 is reticulated vitrious aluminum sponge material although other materials, including non-metallic compounds having similar properties could be readily substituted by one skilled in the art.

Structural elements 713 and 714 respectively include a flange 709 and a flange 710. In an embodiment of separation joint 700, flanges 709 and 710 are located distally on the joint side of member 701. Flanges 709 and 710 each have surfaces for preventing separation of separation joint 700 under compressive and tensile forces placed thereon during the course of normal operation. Surfaces on flanges 709 and 710 mate to corresponding surfaces on member 702. Although a single flange is shown on structural elements 713 and 714 it should be understood that the amount of surface area provided to contact corresponding surfaces on member 702 relates to the loading that can be handled by separation joint 700. Thus, more than one flange can be provided on structural elements 713 and 714 to add more surface area depending on the application. For example, an application requiring separation joint 700 on a fairing of a rocket would not require the amount of surface area for handling compressive and tensile forces placed on separation joint 700 as would be the case of using separation joint 700 for separation of two rocket stages that carries much higher loading under normal operating conditions.

Member 702 comprises a structural element 715, a structural element 716, and a structural element 719. Structural element 719 couples to a major surface of structural elements 715 and 716 holding them substantially parallel to one another. On a structure attachment side of structural element 719, structural elements 715, 716, and 719 form a clevis for receiving structure 721. Structure 721 is rigidly attached to member 702 by bolts 711 that couple through structural element 715, structure 721, and structural element 716. Other equivalent fastening means known to one skilled in the art could also be used to attach structure 721 to member 702.

On a joint side of structural element 719, flanges 717 and 718 are respectively formed on structural elements 715 and 716. Flanges 717 and 718 respectively correspond to flanges 710 and 709 of member 701. Flanges 717 and 718 include surfaces that contact corresponding surfaces on flanges 710 and 709 that prevent separation of separation joint 700 under compressive and tensile forces. In an embodiment of separation joint 700, flanges 710 and 709 are male interconnect. Conversely, flanges 717 and 718 are female interconnect for respectively receiving flanges 710 and 709. Coupling member 701 to member 702 interconnects flanges 710 and 709 respectively with flanges 717 and 718 such that separation joint 700 will not separate under normal operating conditions.

Figure 8:
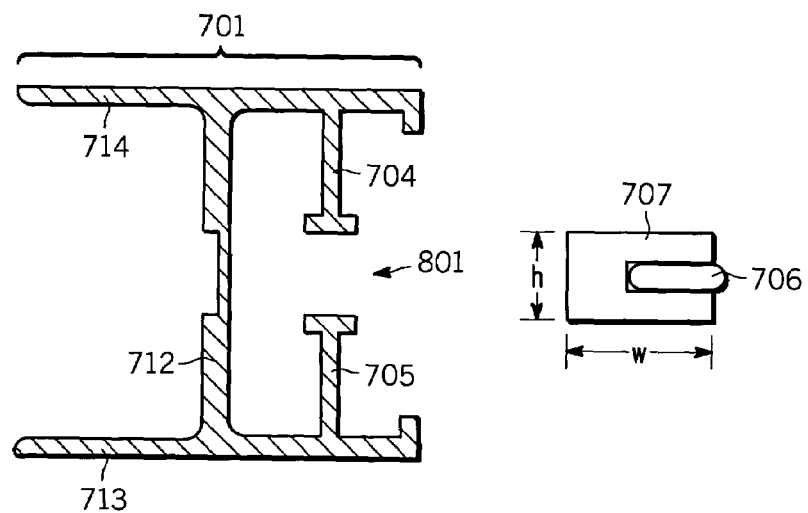
FIG. 8 is cross-sectional view of member 701 of FIG. 7 in a quiescent state.

FIG. 8 is a cross-sectional view member 701 of FIG. 7 in a quiescent state. The quiescent state is a condition of member 701 under normal operating conditions. For example, normal operation would be a condition where the separation joint has not been separated yet. Detonating explosive device 706 would yield a condition where separation joint 700 is not in the quiescent state. In an embodiment of member 701, structural elements 713 and 714 are substantially planar to one another in the quiescent state. Explosive device 706 will reside in opening 801 between the support surfaces of holding members 704 and 705. Crushable material 707 is a damping material placed between explosive device 706 and the support surfaces of holding members 704 and 705. Crushable material 707 is formed in a rectangular shape having a height h and a width w. A slot is formed in one end of the rectangular shape of crushable material 707 and explosive device 706 is fitted in the slot. Explosive device 706 is located between an upper and lower surface of crushable material 707. In an embodiment of member 701, the height of crushable material 707 is made slightly larger than opening 801. This is done so that structural elements 713 and 714 will apply a pressure on crushable material 707 when placed in opening 801 which retains explosive device in position during normal operation of separation joint 700. A width of crushable material 707 is selected to contact the surface of structural element 712 during installation. Explosive device 706 will be centered between the support surfaces of holding members 704 and 705 when crushable material 707 contacts structural element 712 during assembly.

Figure 9:
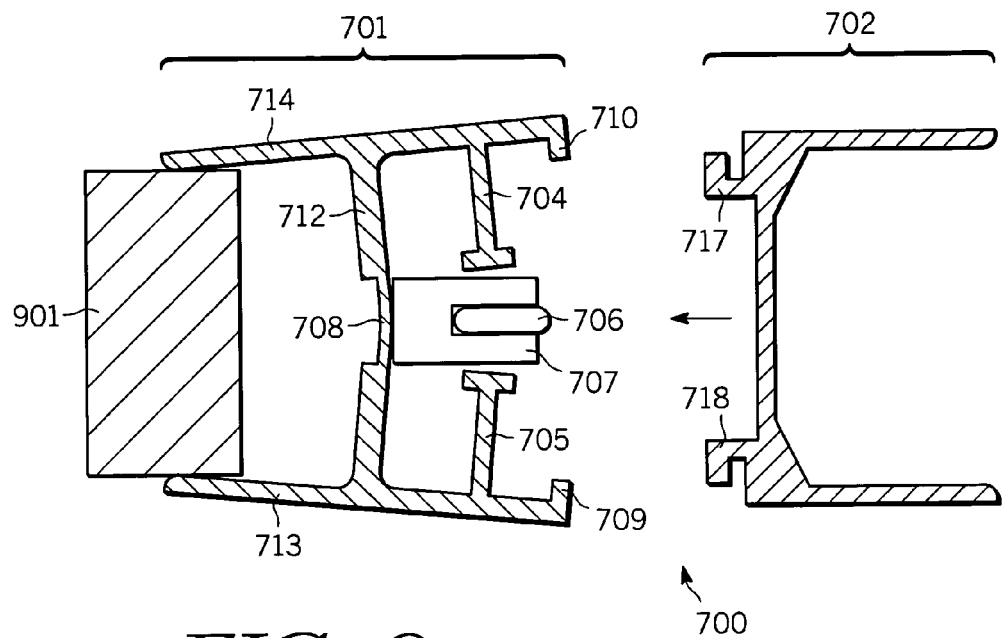
FIG. 9 is a cross-sectional view of members 701 and 702 of FIG. 7 being coupled together.

FIG. 9 is a cross-sectional view of members 701 and 702 of FIG. 7 being coupled together. Members 701 and 702 are formed from a material that within a short range of motion is elastically flexible. The material is chosen such that it will not break or fracture under normal operating conditions or during a separation event. In general, members 701 and 702 are machined or formed metal structures. In an embodiment of separation joint 700, members 701 and 702 are made of aluminum for their light weight, strength, and flexibility.

A spacer 901 is used to prevent damage to member 701 during assembly. Spacer 901 is placed between structural elements 713 and 714. Spacer 901 is smaller in height than an opening between structural elements 713 and 714 on the structural attachment side. A compressive or clamping force is placed on structural elements 713 and 714. Opening 801 widens under this clamping pressure. Similarly, the spacing between flanges 709 and 710 increase. Spacer 901 prevents permanent deformation by limiting the flexing or bending on member 701 under the clamping force. Thinned portion 708 of structural element 712 aids in allowing flexing of member 701 to increase opening 801. Crushable material 707 and explosive device 706 are placed through opening 801 until crushable material 707 contacts the surface of structural element 712. Explosive device 706 is centered between the support surfaces of holding members 704 and 705. Member 702 is aligned and moved towards member 701 for coupling. It should be noted that flanges 710 and 709 are spread a sufficient distance apart to respectively clear flanges 717 and 718 when coupled together. Member 702 is moved until the male portion flanges 710 and 709 align to the female portion of flanges 717 and 718.

Figure 10:
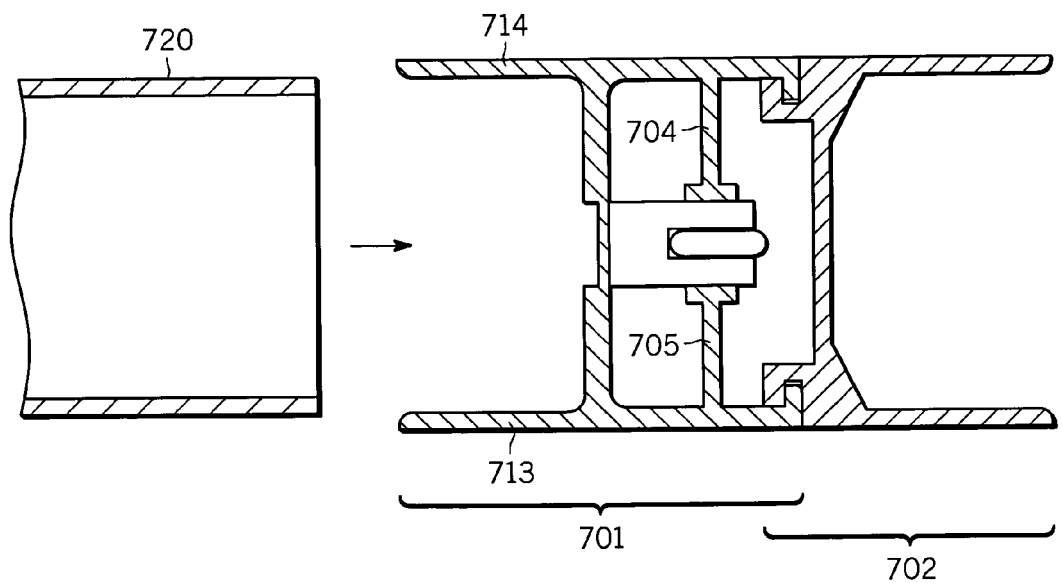
FIG. 10 is a cross-sectional view of members 701 and 702 of FIG. 7 coupled together.

FIG. 10 is a cross-sectional view of members 701 and 702 coupled together. The clamping pressure on structural elements 713 and 714 is released upon alignment of flanges 710 and 717 and flanges 708 and 718. The male portion of flanges 709 and 710 fit into the female portion of flanges 718 and 717 such that surfaces are in intimate contact with one another to prevent separation of separation joint 700 under compressive and tensile forces. It should be noted that member 701 elastically returns to the quiescent state with structural elements 713 and 714 substantially parallel to one another. The support surfaces of holding member 704 and 705 press against crushable material 707. In an embodiment of member 701, crushable material 707 is slightly deformed by the pressure applied by structural elements 713 and 714 returning to the quiescent state. The pressure is useful in fixably holding crushable material 707 and explosive device 706 in place. Structure 720 is then placed in the clevis of member 701 and attached to structural elements 713 and 714. As mentioned previously, attachment of structure 720 is typically held by bolting or other rigid fastening means. Although not shown, structure 721 is similarly attached to member 702.

Figure 11:
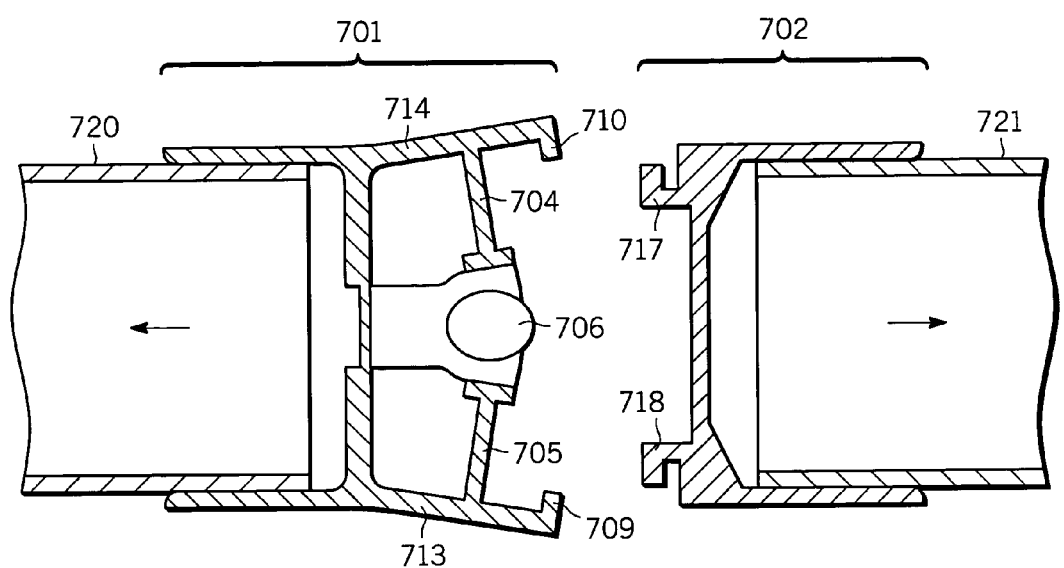
FIG. 11 is a cross-sectional view of separation joint 700 of FIG. 7 decoupling after detonation of explosive device 706.

FIG. 11 is a cross-sectional view of separation joint 700 of FIG. 7 decoupling after detonation of explosive device 706. A thrusting device is used to provide a force to separate separation joint 700 and accelerate structures 720 and 721 away from each other. In an embodiment of separation joint 700, a spring (not shown) is coupled to members 701 and 702 to provide a separation force. Unlike prior art thrusting separation joints, explosive device 706 is not used to propel structures 701 and 702 away from one another but is used to decouple member 701 from member 702. Separation joint 700 is not limited to an embodiment such as spring but is readily implemented to other devices known to one skilled in the art that impart a force to separate separation joint 700 without imparting a significant shockwave to structures 720 and 721.

Detonating explosive device 706 generates gases that radially expand the tube enclosing the explosive material. Explosive device expands from a first volume in the quiescent state to a second volume after detonation. The expanding tube pushes on holding members 704 and 705 spreading flanges 709 and 710 further apart from one another. It should be noted that flanges 709 and 710 do not break or fracture but flexibly bend structural elements 713 and 714. The second volume of explosive device 706 spreads flanges 709 and 710 a sufficient distance to clear flanges 717 and 718 of member 702. In other words, the surfaces mated to one another on flanges 710 and 717 and flanges 719 and 718 are no longer in contact allowing member 701 to freely separate from member 702. A thrusting device moves members 701 and 702 away from one another. The shock wave imparted through separation joint 700 is greatly reduced because constrained energy due to fracturing or shearing of components is not released in this approach. Separation joint 700 also reduces the burden on the payload to be shock resistant allowing it to be manufactured at a lower cost. Weight is saved because many of the current isolation methodologies being deployed will no longer be needed. Moreover, separation joint 700 is easier to assemble and lower cost to manufacture due to decreased complexity of design and operation.

Figure 12:
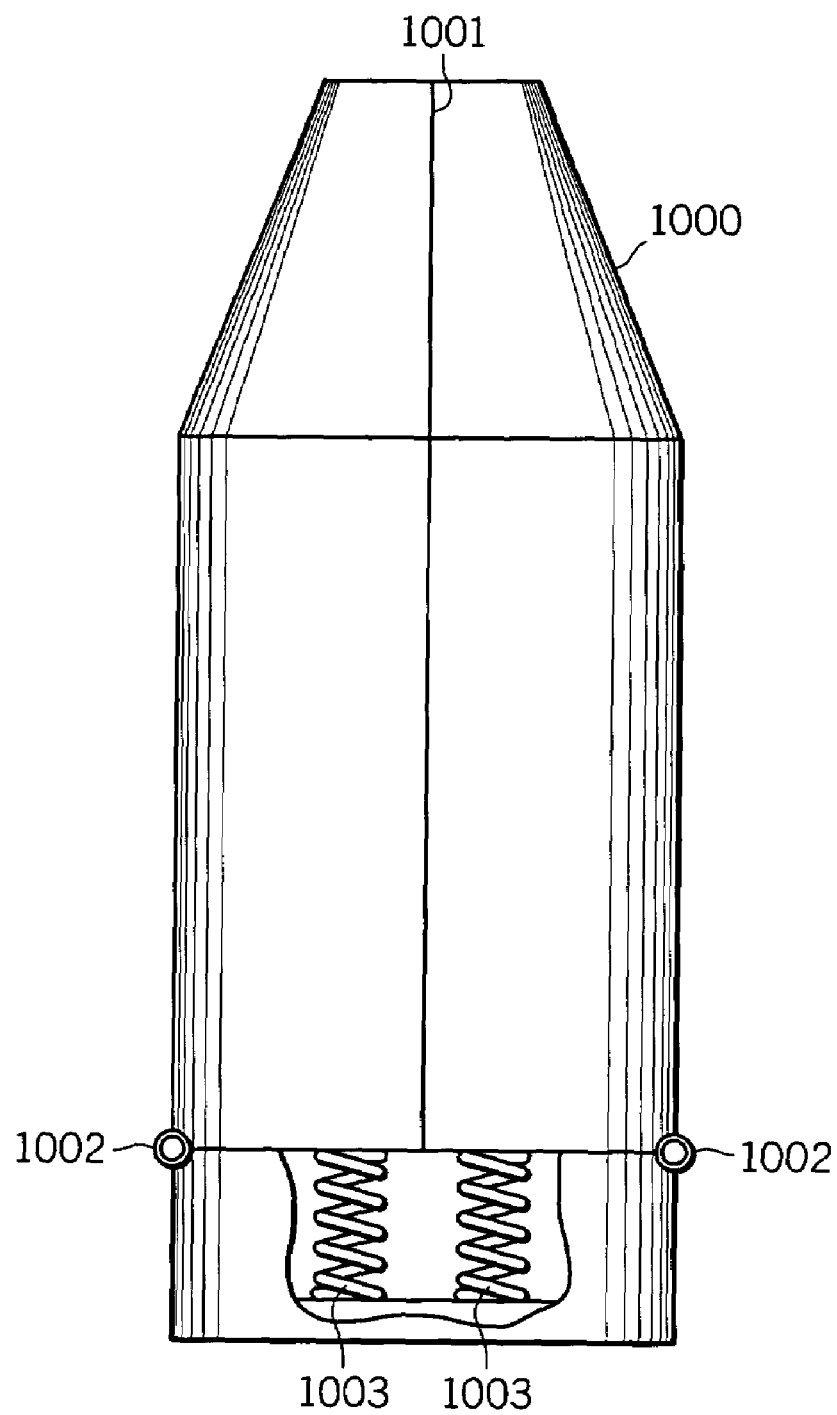
FIG. 12 is an illustration of a fairing in accordance with the present invention.

FIG. 12 is an illustration of a fairing 1000 in accordance with the present invention. Fairing 1000 is a component of a rocket assembly for protecting a payload during the flight of the rocket. Fairing 1000 comprises two half shells joined together by a separation joint 1001. Separation joint 1001 is a separation joint as described in FIGS. 7–11. In an embodiment of fairing 1000, the half shells of fairing 1000 are coupled to the rocket assembly through hinges 1002. Hinges 1002 allow fairing 1000 to swing open when separation joint 1001 decouples without disengaging from the rocket assembly. In an embodiment of fairing 1000, a thrusting device 1003 is used to apply a force on each halve of fairing 1000. For example, thrusting device 1003 is a spring. Both separation joint 1001 and thrusting device 1003 do not send a shockwave that is the result of the release of constrained energy (such as breaking or fracturing metal) when opening fairing 1000.

Figure 13:
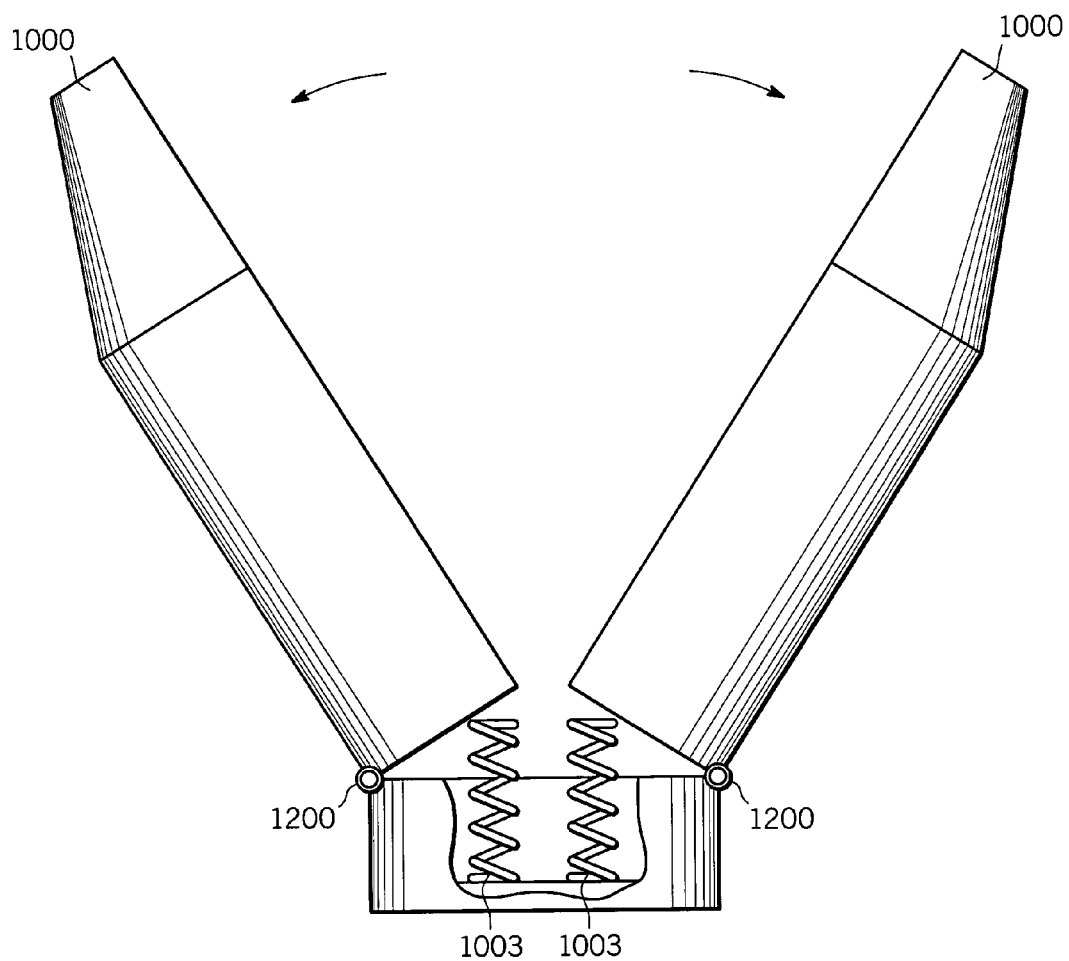
FIG. 13 is an illustration of the fairing of FIG. 12 being opened with a thrusting device after a fairing separation joint is detonated.

FIG. 13 is an illustration of fairing 1000 of FIG. 12 being opened with a thrusting device 1003 after a fairing separation joint 1001 is detonated. Separation joint 1001 no longer holds each halve of fairing 1000 together after detonation. In an embodiment of fairing 1000, the detonation of separation joint 1001 provides little or no thrust to separate each halve of fairing 1000 from each other. Thrusting device 1003 applies a force to fairing 1000 that separates the half shells from one another. For example, thrusting device 1003 as springs applies a force that opens fairing 1000 such that each half shell pivots at hinges 1002 in a radial arc away from one another.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A low shock separation joint for attaching a first structure to a second structure, the low shock separation joint comprising:

a first member including a structure attachment side, a joint side, a clevis formed at said structure attachment side, a first flange formed at said joint side, and a second flange formed at said joint side;

a second member including a third flange corresponding to said first flange on said first member and a fourth flange corresponding to said second flange on said second member, wherein said first member is elastically flexed in response to compressive force placed on said clevis to increase spacing between said first and second flanges, to allow alignment and coupling of said first flange and said third flange, and to allow alignment and coupling of said second flange and said fourth flange, and wherein said first and third flanges mate with one another and said second and fourth flanges mate with one another after said first member is released from flexing to prevent separation of said first and second members under tensile and compressive forces; and an explosive device within said first member, said explosive device being configured to spread said first and second flanges apart from one another when detonated to decouple said first and second members.

2. A low shock separation joint as recited in claim 1 wherein said first member comprises:

a first structural element;

a second structural element; and a third structural element coupled proximally to a major surface of said first and second structural elements to form an I-beam shape.

3. The low shock separation joint as recited in claim 2 wherein said first, second, and third structural elements form said clevis on a structural attachment side of said third structural element for receiving and rigidly attaching to the first structure.

4. The low shock separation joint as recited in claim 3 wherein said first member further includes:

a first holding member extending from said first structural element on a joint side of said third structural element and ending in a support surface;

a second holding member extending from said second structural element on said joint side of said third structural element and ending in a support surface wherein said explosive device is held between said support surfaces of said first and second holding members.

5. The low shock separation joint as recited in claim 4 further including a crushable material on said explosive device such that said support surface of said first and second holding members contact said crushable material and wherein pressure is applied on said crushable material through said first and second holding members thereby preventing movement of said explosive device during normal operation of the separation joint.

6. The low shock separation joint as recited in claim 5 wherein said crushable material comprises an aluminum foam.

7. The low shock separation joint as recited in claim 6, wherein said first flange is on a distal portion of said first structural element on said joint side of said third structural element and said second flange is on a distal portion of said second structural element on said joint side of said third structural element.

8. The low shock separation joint as recited in claim 7 wherein said third structural element includes a thinned region for increasing flexibility of said first member.

9. A low shock separation joint as recited in claim 1 wherein said second member comprises:
- a first structural element;
- a second structural element; and
- a third structural element coupled to a major surface of said first and second structural elements such that said first and second structural elements are substantially parallel to one another, said first structural element including said third flange on a joint side of said third structural element, said second structural element including said fourth flange on said joint side of said third structural element, and said first, second, and third structural elements form a second clevis on a structural attachment side of said third structural element for receiving and rigidly attaching to the second structure.

10. The low shock separation joint as recited in claim 1 wherein detonation of said explosive device moves surfaces of said first flange of said first member out of contact with surfaces of said third flange of said second member, and moves surfaces of said second flange of said first member out of contact with surfaces of said fourth flange of said second member.

11. The low shock separation joint as recited in claim 1 further including a thrusting device coupled to said first and second members to accelerate said first and second members away from one another upon decoupling.

* * * * *